United States Patent
Singh

(10) Patent No.: US 11,441,043 B2
(45) Date of Patent: Sep. 13, 2022

(54) INK COMPOSITION AND METHODS OF USE AND MAKING

(71) Applicant: Leica Biosystems Richmond, Inc., Richmond, IL (US)

(72) Inventor: Rajeev Ranjan Singh, Richmond, IL (US)

(73) Assignee: LEICA BIOSYSTEMS RICHMOND, INC., Richmond, IL (US)

( * ) Notice: Subject to any disclaimer, the term of this patent is extended or adjusted under 35 U.S.C. 154(b) by 515 days.

(21) Appl. No.: 16/665,657

(22) Filed: Oct. 28, 2019

(65) Prior Publication Data

US 2020/0131384 A1    Apr. 30, 2020

Related U.S. Application Data

(60) Provisional application No. 62/752,113, filed on Oct. 29, 2018.

(51) Int. Cl.

| | |
|---|---|
| *C09D 163/00* | (2006.01) |
| *C09D 11/102* | (2014.01) |
| *C08K 3/36* | (2006.01) |
| *C08K 9/06* | (2006.01) |
| *C09D 11/037* | (2014.01) |
| *C09D 11/38* | (2014.01) |
| *C08K 5/5419* | (2006.01) |
| *C09D 11/322* | (2014.01) |
| *C08K 5/17* | (2006.01) |
| *C08K 5/544* | (2006.01) |

(52) U.S. Cl.
CPC ............. *C09D 11/102* (2013.01); *C08K 3/36* (2013.01); *C08K 5/17* (2013.01); *C08K 5/5419* (2013.01); *C08K 9/06* (2013.01); *C09D 11/037* (2013.01); *C09D 11/322* (2013.01); *C09D 11/38* (2013.01); *C09D 163/00* (2013.01); *C08K 5/544* (2013.01); *C08K 2201/005* (2013.01)

(58) Field of Classification Search
CPC ...... C09D 11/102; C09D 163/00; C08K 3/36; C08K 9/06
See application file for complete search history.

(56) References Cited

U.S. PATENT DOCUMENTS

| | | |
|---|---|---|
| 3,816,364 A | 6/1974 | Bayer |
| 6,715,870 B2 | 4/2004 | Kiene et al. |
| 6,766,593 B2 | 7/2004 | Laudat et al. |
| 2003/0114573 A1* | 6/2003 | Cuch .................... C09D 129/04 524/492 |
| 2004/0127604 A1 | 7/2004 | Meyer et al. |

FOREIGN PATENT DOCUMENTS

| | | |
|---|---|---|
| CN | 1729255 A | 2/2006 |
| CN | 112823190 A | 5/2021 |
| WO | 2001059017 A1 | 8/2001 |
| WO | 2016/123602 A1 | 8/2016 |
| WO | WO-2016123602 A1 * | 8/2016 |

OTHER PUBLICATIONS

International Search Report and Written Opinion for PCT/US2019/058335 dated Jan. 16, 2020.
"Leica IP C & IP S", Leica Biosystems, 2012, 12 pages.
"HistoCore Perma S", Leica Biosystems, 2017, 4 pages.
International Preliminary Report on Patentability, App. No. PCT/US2019/058335 dated Apr. 27, 2021.
Extended European Search Report for European App No. 19878927.3 dated Apr. 22, 2022.
Office Action for CN Application 201980064111.X dated Jun. 6, 2022.

* cited by examiner

*Primary Examiner* — Vu A Nguyen
(74) *Attorney, Agent, or Firm* — Thompson Coburn LLP; William A. Holtz

(57) ABSTRACT

Provide herein is an ink that can be coated onto a substrate such as a glass slide. The use of at least two distinct wax treated silica powders with different porosities provides the multipurpose functionality of thermal and inkjet printing onto an ink coated substrate for purposed, for example, of labeling.

31 Claims, No Drawings

INK COMPOSITION AND METHODS OF USE AND MAKING

CROSS-REFERENCE TO RELATED APPLICATIONS

This U.S. Non-Provisional Application claims priority to U.S. Provisional Application No. 62/752,113, filed Oct. 29, 2018, which is incorporated herein by reference in its entirety.

BACKGROUND

Current microscope or specimen slides often include a "frosted" portion as a marking surface. This frosted portion can be created by sandblasting, acid etching, mechanical abrading, or other method of roughening the surface of the glass so that a permanent marking surface is created to accept marking by pen, pencil, printer, or other marking instrument. These techniques create a frosted surface by removing material from the glass surface, therefore necessarily resulting in a marking surface which is recessed from, or certainly no higher than, the surface of the glass slide. Furthermore, such frosted glass, while providing a matte surface on the glass, does not typically result in a marking surface having a pronounced background to contrast with information to be written thereon.

Glass microscope slides can be screen printed to enable identifying information to be printed directly to or on the microscope slide. In some cases, a screen printed ink is applied and inkjet-printed ink is then applied to the screen printed ink. The screen-printed ink is thermally cured and the inkjet-printed ink is cured using ultraviolet light. The inkjet-printed ink can include a pattern with identifying information for the slide or the sample contained on the slide. However, this arrangement has drawbacks. The inkjet-printed ink can spread, rendering the identifying information incomplete or illegible. The inkjet-printed ink also is raised, rendering it prone to wear, scratching, or removal. Such slides also may be prone to retaining dye used during microscope slide processing.

Based on these drawbacks, there exists an ongoing and unmet need for an improved ink for microscope slides.

SUMMARY

Provided for in this disclosure is an ink composition comprising: a base epoxy ink; a pigment; a catalyst; a first wax treated silica powder; and a second wax treated silica powder that has a different porosity than the first wax treated silica powder. In certain aspects, the ink composition further comprises one or more of: an accelerator; a first silane; a second silane that is different from the first silane; and a thinner. Thus, in certain aspects, the ink composition comprises: the base epoxy ink; the pigment; the catalyst; the first wax treated silica powder; the second wax treated silica powder; the accelerator; the first silane; the second silane; and the thinner. In certain aspects, the first wax treated silica powder has a porosity of about 1.4 ml/gm to 1.6 ml/gm and/or the second wax treated silica powder has a porosity of about 1.15 ml/gm to 1.35 ml/gm. In certain aspects, the first wax treated silica powder has a porosity of about 1.6 ml/gm and/or the second wax treated silica powder has a porosity of about 1.25 ml/gm. In certain aspects, the first silane provides for the adherence of thermal ink onto a substrate and/or the second silane provides for a matt finish of the cured ink on the substrate.

In certain aspects, the ink composition is used for coating and/or printing onto a substrate. In certain aspects, the substrate is glass such as a glass microscope or histology/specimen slide. Further, in certain aspects, the ink composition is itself, such as when applied and adhered as a layer on a slide, is itself a substrate that can be printed on by either inkjet or thermal printing.

Also provided for herein are methods of making said ink composition. Also provided for herein is a method of coating a substrate with said ink composition. Also provided for herein is a method of printing on a glass slide by using the ink composition as a coating that is printed onto by inkjet or thermal printing. Also provided for herein is a glass slide, wherein a portion of the surface of the slide is coated with a layer of the ink composition.

DETAILED DESCRIPTION

Definitions

It is to be noted that the term "a" or "an" entity refers to one or more of that entity; for example, "an ink" is understood to represent one or more inks. As such, the terms "a" (or "an"), "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following: A, B, and C; A, B, or C; A or C; A or B; B or C; A and C; A and B; B and C; A (alone); B (alone); and C (alone).

Unless defined otherwise, all technical and scientific terms used herein have the same meaning as commonly understood by one of ordinary skill in the art to which this disclosure is related.

Units, prefixes, and symbols are denoted in their Système International de Unites (SI) accepted form.

Numeric ranges are inclusive of the numbers defining the range. Even when not explicitly stated as "or any values or ranges in between," or the like, it is understood that a range such as 1 to 10, explicitly includes all subranges, e.g., 1 to 6, 3 to 8, 2.5 to 5.5, etc., and values, e.g., 3, 7, 9.4, etc. within the range, unless otherwise stated.

The headings provided herein are not limitations of the various aspects or embodiments of the disclosure, which can be had by reference to the specification as a whole.

Wherever aspects or embodiments are described with the language "comprising," otherwise analogous aspects or embodiments described in terms of "consisting of" and/or "consisting essentially of" are also provided.

Overview

Glass microscope slides can be printed on to enable identifying information to be applied directly to or on the microscope slide. This microscope slide identifying information can include, for example, a patient name or identification, a type of sample, test(s) to be performed, test(s) that have been performed, or other data known to those skilled in the art. This information or data may be in the form of alphanumeric characters, a barcode (e.g., linear, matrix, or other two-dimensional barcode), a logo, a symbol, or other text or graphics. The identifying information may be used to, for example, archive samples, track samples, determine what testing or processes have been performed on a sample, or check in/check out samples. In certain aspects, the identifying information can withstand stains, xylene, alcohol, or other chemicals frequently used while processing the microscope slides such as in histological applications.

Ink Composition

Provide herein is an ink composition that can be applied to a substrate. The substrate can be any of numerous substrate materials including glass, metal, plastic, wood, ceramic, carbon fiber, composite, stone, paper/cardboard, and rubber. In certain aspects, the substrate is glass, such as a glass microscope or histology/specimen slide. In certain aspects, the substrate can be coated with the ink composition, for example, such that a portion of the substrate is substantially or completely covered by a layer of the ink composition. Coating can be achieved by a number of methods known to those of ordinary skill in the art, as described herein, including by printing or screen-printing. In certain aspects, text or graphics (e.g., barcodes or other identifying symbols) can be printed with the ink composition onto the substrate. In certain aspects, the ink composition is multipurpose with respect to the printing method as the printing can be done with at least inkjet or thermal printing technology. Further, in certain aspects, the ink composition when applied to a substrate can further serve as a substrate to be printed on. For example, in certain aspects, a substrate is coated with the ink composition and then the portion of the substrate coated with the ink composition is further printed on. In certain aspects, the ink composition is thermally curable, for example comprising an epoxy-based, thermally-curable ink. In certain aspects, the ink composition applied to the substrate is dried and/or cured (e.g., thermally cured) before it is further printed on (e.g., U.S. Pat. No. 6,766,593 which is incorporated by reference herein). In certain aspects, the ink composition is multipurpose with respect to how it is printed on as the further printing is done with inkjet or thermal printing technology and inks. In certain aspects, the ink composition allows for printing at lower print head heat settings compared to current methods, thus improving the print head life by at least about 10%, 15%, 20%, 25%, 30%, 35%, 40%, 45%, or 50% compared to methods utilizing higher temperatures.

In certain aspects, the ink composition comprises:
 a base epoxy ink;
 a pigment;
 a catalyst;
 a first wax treated silica powder having an average particle size of about 4 to 6 microns, a melting point of wax of about 65 to 85° C., and a pH of about 7;
 a second wax treated silica powder that has a different porosity than the first wax treated silica powder and having an average particle size of about 4 to 6 microns, a melting point of wax of about 65 to 85° C., and a pH of about 7.

In certain aspects, the ink composition further comprises one or more of:
 an accelerator;
 a first silane;
 a second silane that is different from the first silane; and
 a thinner.

Base Epoxy Ink

The basis of the ink composition is a base epoxy ink. Representative examples of a base epoxy ink include 50-110RX. The amount of the base epoxy ink will vary depending on the amounts of the various other components. One of ordinary skill in the art will understand that the % by weight amounts of all the components in the composition will add up to the total weight of the composition (100%). In certain aspects, the amount of the base epoxy ink can be as low as about 6.8% by weight of the composition. In certain aspects, the amount of the base epoxy ink can be as high as about 78% by weight of the composition. Thus, in certain aspects, the base epoxy ink is in an amount of about 6.8% to 78% by weight of the composition. For example, in certain aspects, the base epoxy ink is in an amount of any of about 6.8%, 6.9%, 7.0%, 7.5%, 8.0%, 9%, 10%, 12%, 15%, 20%, 25%, 30%, 40%, 50%, 51.5%, 60%, 70%, or 75% by weight of the composition to any of about 6.9%, 7.0%, 7.5%, 8.0%, 9%, 10%, 12%, 15%, 20%, 25%, 30%, 40%, 50%, 51.5%, 60%, 70%, 75%, or 78% by weight of the composition. In certain aspects, the amount of the base epoxy ink does not exceed about 51.5% by weight of the composition. Thus, in certain aspects, the base epoxy ink is in an amount of about 6.8% to 51.5% by weight of the composition.

Pigment

The pigment provides the desired color and can provide surface properties. The pigment can be any color. For example, in certain aspects, the pigment is white, black, yellow, cyan, or magenta. Examples of various suitable ink pigments are well known to those of ordinary skill in the art. In certain aspects, the amount of the pigment can be as low as about 1% by weight of the composition. In certain aspects, the amount of the pigment can be as high as about 5% by weight of the composition. Thus, in certain aspects, the pigment is in an amount of about 1% to 5% by weight of the composition. For example, in certain aspects, the pigment is in an amount of any of about 1%, 2%, 3%, or 4% by weight of the composition to any of about 2%, 3%, 4%, or 5% by weight of the composition. The more concentrated the pigment, the darker the shade of color. A lower concentration of pigment will have a lighter shade of color. Having too high of a concentration however, e.g., higher than 5% by weight of total composition, can change the surface smoothness of the ink to matte which in turn can adversely affect thermal printing. For thermal printing, the media surface (substrate) should be smooth and uniform. Otherwise, the print quality will be compromised such as printed information on the slide having variable print shading.

Catalyst

The catalyst provides the appropriate adhesion to the substrate and provides resistance to dye penetration during end user processing such as using tissue staining chemicals. Representative examples of useful catalysts include 1,4,5,6,7,6-Hexachloro-5-norborbornene-2,3-dicarboxylic anhydride, commonly named chlorendic anhydride. In certain aspects, the amount of the catalyst can be as low as about 15% by weight of the composition. In certain aspects, the amount of the catalyst can be as high as about 25% by weight of the composition. Thus, in certain aspects, the catalyst is in an amount of about 15% to 25% by weight of the composition. For example, in certain aspects the catalyst is in an amount of any of about 15%, 16%, 17%, 18%, 19%, 20%, 21%, 22%, 23%, or 24% by weight of the composition to any of about 16%, 17%, 18%, 19%, 20%, 21%, 22%, 23%, 24%, or 25% by weight of the composition. Lower concentrations of the catalyst can have adverse effects on adhesion of the ink on the substrate. In some cases, compromised adhesion may not be observed until the printing is exposed to a strong chemical solvent like Xylene or chromic acid for an extended period of time. If the concentration of catalyst is too high, the surface tension of the cured ink will be increased and thermal printing can be compromised for its adherence property when exposed to Xylene. This can also compromise the adherence of inkjet printing on a substrate, such as a glass slide.

Accelerator

The accelerator contributes to the desired curing schedule, temperature, and surface properties. Representative examples of useful accelerators include the class of tertiary amines, for example 2-[2-(Diemthylamino)ethoxy]ethanol. In certain aspects, the amount of the accelerator can be as low as about 0.01% by weight of the composition. In certain aspects, the amount of the accelerator can be as high as about 0.2% by weight of the composition. Thus, in certain aspects, the accelerator is in an amount of about 0.01% to 0.2% by weight of the composition. For example, in certain aspects the accelerator is in an amount of any of about 0.01%, 0.05%, 0.1%, or 0.15% by weight of the composition to any of about 0.05%, 0.1%, 0.15%, or 0.2% by weight of the composition. Formulations with lower concentrations of accelerator will require relatively more temperature and time schedule to cure the ink on the substrate. On the other hand, if the concentration is more than 0.2% by total weight of the composition, a standard schedule and temperature may change the shade of the cured ink color. For example, white cured ink can turn a light yellow as if it has burnt inside the curing oven ("over cured"). This may be due to the fact that high concentrations of accelerator greatly reduce the curing time and temperature needed. Higher concentrations of accelerator can also reduce the surface tension of the cured ink where the end user inkjet printing can be compromised. For example, printing with barcode dots and text letters can spread or "run" and can almost/will touch each other. This, in turn, can affect the readability and scanability of inkjet-printed slides.

Wax Treated Silica Powders

The use of at least two distinct wax treated silica powders with different porosities can provide the multipurpose functionality of thermal and inkjet printing of the same ink formulation on a substrate. Such wax treated silica powders are known to be commercially available to those of ordinary skill in the art. Although the porosities differ, in certain aspects, the wax treated silica powders generally share other specifications, including: having an average particle size of about 4 to 6 microns; a melting point of the wax of about 65 to 85° C.; and a pH of about 7.

A first wax treated silica powder (e.g., a first commercially available wax treated silica powder) with a higher porosity provides the adherence of the thermal printing on the cured ink. The core function is to provide optimal surface properties to ensure an effective thermal printing process. In certain aspects, the first wax treated silica powder has a porosity of about 1.4 ml/gm to 1.6 ml/gm. In certain aspects, the first wax treated silica powder has a porosity of about 1.6 ml/gm. Representative examples of a first wax treated silica powder include SY-356 (Amorphous Silicon Dioxide, surface treated with Hydrocarbon type wax). In certain aspects, the amount of this first silica powder can be as low as about 3% by weight of the composition. In certain aspects, the amount of this first silica powder can be as high as about 8% by weight of the composition. Thus, in certain aspects, this first silica powder is in an amount of about 3% to 8% by weight of the composition. For example, in certain aspects the first silica powder is in an amount of any of about 3%, 4%, 5%, 6%, or 7% by weight of the composition to any of about 4%, 5%, 6%, 7%, or 8% by weight of the composition. Low concentrations of this first silica powder can reduce the binding effectiveness of thermal printing on the slide wherein the print may come off in a strong chemical solvent like Xylene. High concentrations of the powder can result in dye pick during the staining process because higher concentrations create more porosity to the surface.

A second wax treated silica powder (e.g., a second commercially available wax treated silica powder) with a lower porosity provides desired absorption of inkjet ink on the cured surface, providing a clear and crisp inkjet printing on the substrate. Because of the higher porosity of the first wax treated silica powder, inkjet printing on the substrate will spread and readability and scanability can be compromised. By incorporating a second wax treated silica powder with a lower porosity, the flow of inkjet ink onto the substrate is controlled, which provides clear inkjet quality. In certain aspects, the second wax treated silica powder has a porosity of about 1.15 ml/gm to 1.35 ml/gm. In certain aspects, the second wax treated silica powder has a porosity of about 1.25 ml/gm. Representative examples of a second wax treated silica powder include SY-436 (Amorphous Silicon Dioxide, surface treated with Hydrocarbon type wax). In certain aspects, the amount of this second silica powder can be as low as about 1% by weight of the composition. In certain aspects, the amount of this second silica powder can be as high as about 5% by weight of the composition. Thus, in certain aspects, this second silica powder is in an amount of about 1% to 5% by weight of the composition. For example, in certain aspects the second silica powder is in an amount of any of about 1%, 2%, 3%, or 4% by weight of the composition to any of about 2%, 3%, 4%, or 5% by weight of the composition. Low concentrations can affect inkjet print readability and scanability. High concentrations can create excess material that can come off during aggressive chemical exposure such as to Xylene. Further, high concentrations of the powder can result in dye pick during the staining process because higher concentrations create more porosity to the surface.

In certain aspects, the difference in porosity between the first and second wax treated silica powders is about or at least about 0.05 ml/gm, 0.1 ml/gm, 0.15 ml/gm, 0.2 ml/gm, 0.25 ml/gm, 0.3 ml/gm, 0.35 ml/gm, 0.4 ml/gm, or 0.45 ml/gm. In certain aspects, the difference in porosity between the first and second wax treated silica powders is not more than about 0.5 ml/gm, 0.45 ml/gm, 0.4 ml/gm, 0.35 ml/gm 0.3 ml/gm, or 0.25 ml/gm. In certain aspects, the difference in porosity between the first and second wax treated silica powders is any of about 0.05 ml/gm, 0.1 ml/gm, 0.15 ml/gm, 0.2 ml/gm, 0.25 ml/gm, 0.3 ml/gm, 0.35 ml/gm, 0.4 ml/gm, or 0.45 ml/gm to any of about 0.1 ml/gm, 0.15 ml/gm, 0.2 ml/gm, 0.25 ml/gm, 0.3 ml/gm, 0.35 ml/gm, or 0.4 ml/gm, 0.45 ml/gm, or 0.5 ml/gm.

Silanes

Silanes are a class of compounds known as "coupling agents". Examples of silanes are commercially available and the selection of different silanes can be useful in forming a durable bond between organic and inorganic materials. In certain aspects, at least two silanes are used. Silanes in the ink composition are used to improve adhesion and surface properties of the cured ink. In certain aspects, one or more silane improves adhesion of the ink on the substrate. At the same time, one silane provides surface property where binding effectiveness of the thermal ink is achieved and another silane provides a light matt finish on the surface where inkjet ink is absorbed by the silica powder.

In certain aspects, a first silane can provide adherence of the thermal printed information on the cured substrate surface. Representative examples of a first silane include BIS(3-TRIMETHOXYSILYLPROPYL)AMINE. In certain aspects, the amount of the first silane can be as low as about 3% by weight of the composition. In certain aspects, the amount of the first silane can be as high as about 6% by weight of the composition. Thus, in certain aspects, the first silane is in an amount of about 3% to 6% by weight of the composition. For example, in certain aspects the first silane is in an amount of any of about 3%, 4% or 5% by weight of the composition to any of about 4%, 5%, or 6% by weight of the composition. Low concentrations of this first silane can reduce binding effectiveness of thermal printing onto the substrate. This first silane is used to provide the adherence property of thermal ink when mixed with silica powder. The silane helps binding the silica powder together upon curing, which in turn provides adherence of thermal ink onto the substrate, even when exposed to aggressive chemical solvents like Xylene. High concentrations can increase the surface tension of the cured ink which can negatively affect adherence of inkjet printing on the substrate as in some aspects, for example, the inkjet ink will not be able to move through the pores of the silica powder before it is flashed with UV lamp of the IPS printer. This can result in curing of the inkjet ink onto the surface of the substrate where print may smear.

In certain aspects, a second silane provides boldness to the printed information when using inkjet technology. Representative examples of a second silane include (3-Aminopropyl)triethoxysilane. In certain aspects, the amount of the second silane can be as low as about 0.5% by weight of the composition. In certain aspects, the amount of the second silane can be as high as about 4% by weight of the composition. Thus, in certain aspects, the second silane is in an amount of about 0.5% to 4% by weight of the composition. For example, in certain aspects the second silane is in an amount of any of about 0.5%, 1%, 2%, or 3% by weight of the composition to any of about 1%, 2%, 3%, or 4% by weight of the composition. Low concentrations of this second silane can reduce the contrast (boldness) of the inkjet print on the substrate. This can result in reduced readability and scanability because there are minimum contrast requirements for barcode scanners and other such devices to operate. High concentrations can increase the contrast, but if too high, the printed information may look like it is spreading in inkjet applications. This can also affect readability and scanability because letters or barcode dots touch each other. High concentrations can increase the surface tension of the cured ink which can cause adherence issues with inkjet printing on the substrate as in some aspects, for example, the inkjet ink will not be able to move through the pores of the silica powder before it is flashed with UV lamp of the IPS printer. This can result in curing of the inkjet ink onto the surface of the substrate where print may smear.

Thinner

The thinner is needed to provide the necessary property of a viscous fluid capable of being applied in the manner prescribed by the process. The selection of this thinner proved optimal in the formulation. It provides desired viscosity and in certain aspects helps dispersion of powder ingredients before mixing with the base ink. This maintains the consistency of the ink and quality of the screen printing process throughout the batch. Representative examples of a thinner include ENTHONE (registered trademark) AD-2003, a proprietary blend of 2-(2-ehtoxyethoxy) ethyl acetate. In certain aspects, the amount of the thinner can be as low as about 25% by weight of the composition. In certain aspects, the amount of the thinner can be as high as about 40% by weight of the composition. Thus, in certain aspects, the thinner is in an amount of about 25% to 40% by weight of the composition. For example, in certain aspects the thinner is in an amount of any of about 25%, 30%, or 35% by weight of the composition to any of about 30%, 35%, or 40% by weight of the composition. Low concentrations of thinner can create manufacturing difficulties where dispersion of some powders will not be possible. At the same time, the viscosity of the final ink will be high and screen printing will not be easy to perform. This can result in lower pot like of the ink and may result in breaking of screen during screen printing as the flow of ink will not be smooth on the screen. A high thinner concentration will alleviate the issue of powder dispersion but can result in lower viscosity wherein the occurrence of manufacturing defects like pin holes, dots on the print, etc., may be higher. This can result in higher scrap as well as printing defects using thermal printing because the surface of the cured ink will not be smooth.

TABLE 1

Representative Ink Compositions

| Component | Amount by % total weight | |
|---|---|---|
| | low | high |
| Base Epoxy Ink | 6.8 | 78 |
| Pigment | 1 | 5 |
| Accelerator | 0.01 | 0.2 |
| Catalyst | 15 | 25 |
| Wax Treated Silica Powder (w/higher porosity) | 3 | 8 |
| Wax Treated Silica Powder (w/lower porosity) | 1 | 5 |
| Silane for adherence of printing on cured surface | 3 | 6 |
| Silane for boldness of inkjet printing | 0.5 | 4 |
| Thinner | 25 | 40 |

Ink Mixing

In certain aspects, the silanes are mixed into thinner (see, e.g., Examples below). Mixing of the silanes with thinner first confirms that the silanes are completely dissolved in thinner, which otherwise may not have uniform effect of silanes on the cured surface where end user may see variation in print quality.

In certain aspects, a mixture of silanes is added into a mixture of silica powders and dispersed before being mixed into the base ink (see, e.g., Examples below). Adding the mixture of silanes into the powders and dispersion before addition to the base epoxy ink confirms that the powder has been wetted using the silane solution, which otherwise may not get mixed completely in the ink formulation, which can result in screen printing issues in manufacturing. At the same time this can affect the final ink not being uniform, where end user will have variation in print quality and subsequently performance issues.

Labeling

Provided herein is a method of printing wherein a substrate is coated with an ink composition of this disclosure and the coated portion of the substrate is further printed on (WO 2016/123602 A1, which is incorporated herein by reference). For example, characters, logos, and barcodes can be printed onto a substrate such as a histology cassette or glass slide to label it, such as for specimen tracking. Thus, in certain aspects, the ink composition provides suitable adhesion of a coating to a substrate such as a glass slide and provides a coated surface that can be printed on by inkjet or thermal printing such that the printed ink has desirable spreading (i.e., the printing provides legible alpha numeric characters). In certain aspects, the printing on the ink composition coated surface provides at least 300 dpi resolution (e.g., text and direct barcode print). In certain aspects, the printing is resistant to smudging or fading over time so that the labeling remains readily identifiable for many years in storage and/or through a process such as histological staining wherein the printing may be subject to different chemical agents. Direct printing onto the area coated with the ink composition can greatly reduce opportunities for human error and misidentified specimens such as via transposed numbers, misread handwriting, and peeling or misaligned labels. The ability to print machine-readable barcodes adds to the potential for automated trackability. For example, in certain aspects, the substrate (e.g., slides or cassettes) can be held in multiple magazines in a printing device (e.g., U.S. Pat. No. 6,715,870, which is incorporated herein by reference), thus accommodating a variety of different substrates. Further, when unloaded after printing, the substrates can be grouped while maintaining their correct sequence and/or organization.

Coating

In certain aspects, this disclosure provides for methods of using as a coating an ink composition disclosed herein. For example, the ink composition is used to form a layer on a substrate such as a glass slide (e.g., a glass microscope or histology/specimen slide). In certain aspects, a method for forming a layer on a substrate comprises: a) deposition of a layer of the ink composition on at least a portion of at least one surface of the substrate. In certain aspects, the method further comprises b) heating the coated substrate such that a thermally-cured layer of the ink coating composition is formed on at least one surface of the substrate. In certain aspects, the method further comprises deposition (e.g., printing using UV- or thermally-curable inks) of information on the thermally-cured layer of the coating composition. Further, in certain aspects, the substrate is contacted with a surfactant after deposition of the layer of coating composition.

As noted, the layer of ink coating composition can be applied/deposited on at least a portion of at least one surface of a substrate. Suitable methods are known in the art. For example, the layer of ink coating composition can be deposited by screen-printing methods, spray coating methods, dip coating methods, brushing, or similar methods. In certain aspect, the thickness of the as deposited layer of screen printing composition can be, for example, about 0.0001 inch to 0.001 inch, including all values to about 0.0001 inch and all ranges there-between. In certain aspects, the thickness of the as deposited layer of screen printing composition is about 0.0005 inch±0.0002 inch. In certain aspects, the layer is deposited by methods such as, for example, screen-printing.

In certain aspects, the layer of ink coating composition deposited on the substrate can be dried and/or cured by heating. For example, the curing can be carried out in an oven at a temperature of 120° C. to 215° C., including all integer ° C. values and ranges there-between, for 5 minutes to 120 minutes, including all integer minute values and ranges there-between. In certain aspects, the dimensions of the thermally-cured layer of coating composition are substantially similar to those of the as deposited layer of coating composition.

As described herein, in certain aspects, information can be deposited on the thermally-cured layer of coating composition. The information can be data. This information can be in the form of alphanumeric characters, a barcode (e.g., linear, matrix, or other two-dimensional barcode), graphics (e.g., a logo or symbol), or other text. In certain aspects, some or all of the information may include patient and/or sample information. Some or all of the information may specifically identify a particular slide and/or sample. The identifying information can be used to, for example, archive samples, track samples, determine what testing or processes have been performed on a sample, or check in/check out samples. For example, the information can be deposited on the thermally-cured layer of ink coating composition by ink-jet or thermal printing (e.g., using water or solvent based inks). In another example, the information can be deposited on the thermally-cured layer of coating composition using a solvent-resistant pen used in histology labs (e.g., a Histopen).

In certain aspects, a variety of glass slides can be used. The glass slides can be glass slides used in histology labs (e.g., a glass microscope slide). Examples of glass slides include Snowcoat® slides available from Leica, Xtra® slides available from Leica, and Superfrost™ available from Fisherbrand. The slides can have a variety of sizes, for example, with a length of 75 mm±0.5 mm, a width of 25 mm±0.5 mm, and a thickness of 0.04"+0.0037-0.005". In certain aspects, the combined total of glass thickness and thermally-cured layer of screen printing composition thickness does not exceed 1.2 mm. The glass slides may be suitable for cellular (e.g., cytology) or molecular samples. The glass slides may be suitable for a histology sample (e.g., whole organisms or a part thereof, tissue samples, including blood and organ tissues, from a human or non-human animal, and cell(s), including isolated cell(s) and cell(s) in culture). In certain aspects, the glass slide is a microscope slide that conforms to ISO 8037-1 and/or -2. In certain aspects, the glass slide is a microscope slide made from green glass or white glass. The glass slide may itself be hydrophobic, hydrophilic, or wettable. The glass slide may have a coating to provide desired wettability and/or charge characteristics. Suitable glass slides are known in the art and commercially available.

The present disclosure also provides for articles comprising one or more of the ink compositions. For example, an article is an ink composition coated histology cassette or glass slide. In certain aspects, the article comprises a thermally-cured layer of the ink coating composition disposed on at least a portion of at least one surface of the article. In certain aspects, the article has information deposited on the exterior surface on the layer of thermally-cured layer of the ink coating composition. In certain aspects, the article further comprises a cellular sample (e.g., a cytology sample) or molecular sample. In certain aspects, the article further comprises histology sample. Glass slides, for example, can exhibit desirable characteristics such as adhesion, surface characteristics (e.g., ink spreading), and/or minimal dye retention of the thermally-cured layer of the coating composition. Also, the glass slides can exhibit desirable permanence (e.g., print image/visual appearance, wipe resistance, and/or barcode readability) of the information deposited on the exterior surface of the on the layer of thermally-cured layer of the coating composition.

EXAMPLES

Example Multipurpose Ink Making Process

1. Add the pigment to container containing the base epoxy ink.

2. Add the accelerator to the container containing the base epoxy ink and pigment. Mix for 2-3 minutes (e.g., using a hand drill tool or particle disperser).

3. Adding the catalyst into the same container. Mix for 2-3 minutes (e.g., using a hand drill tool or particle disperser). Set mixed ink aside.

4. Add the first and the second wax treated silica powders into the same container.

5. Add the thinner into another separate container.

6. Add one of the silanes into the container with the thinner and mix.

7. Add the other silane into the container with the thinner and first silane and mix.

8. Add the mixture of the silanes and thinner into the container with the wax treated silica powders. Mix for 2 minutes (e.g., vortex at full speed). Repeat this dispersing process two more times with a gap of a minimum of 2 minutes.

9. Add the mixture in step 8 into the ink set aside in step 3. Mix for 2-3 minutes (e.g., with a drill tool).

10. Mix the ink with a particle disperser for 10 minutes.

The ink is now ready for printing. In certain aspects, the ink is used within 24 hours or preparation.

Example Curing Schedule and Temperature

A. Parameters:

1. Glass travel time inside the oven: 6 minutes
2. Average temperature of the glass inside the oven: 160-177° C.
3. Time at average temperature inside the oven minimum of 2 minutes (range could be 2-3 minutes).
4. Time at >148° C. inside the oven minimum of 3.5 minutes (range could be 3.5 to 4.5 minutes).

B. Effects:

1. If the profile is on the lower end, there can be an ink curing issue that may create an ink adhesion issue on the glass substrate when exposed to aggressive chemical solvents such as Xylene. This may also result in dye pick during H&E and/or special staining process.
2. If the profile is on the upper end, there is a potential of change in color of cured ink on the glass substrate. This might look like cured ink is burnt. This can also result in spreading of inkjet print on the surface which in turn result in issue with print readability and barcode scanability.

The breadth and scope of the present disclosure should not be limited by any of the above-described exemplary aspects or embodiments, but should be defined only in accordance with the following claims and their equivalents.

What is claimed is:

1. An ink composition comprising:
   a base epoxy ink;
   a pigment;
   a catalyst;
   a first wax treated silica powder having an average particle size of about 4 to 6 microns, a melting point of the wax of about 65 to 85° C., and a pH of about 7; and
   a second wax treated silica powder that has a different porosity than the first wax treated silica powder and having an average particle size of about 4 to 6 microns, a melting point of the wax of about 65 to 85° C., and a pH of about 7.

2. The ink composition of claim 1, wherein:
   the base epoxy ink is in an amount of about 6.8% to 78% by weight of the composition;
   the pigment is in an amount of about 1% to about 5% by weight of the composition;
   the catalyst is in an amount of about 15% to 25% by weight of the composition;
   the first wax treated silica powder is in an amount of about 3% to 8% by weight of the composition; and/or
   the second wax treated silica powder is in an amount of about 1% to 5% by weight of the composition.

3. The ink composition of claim 1 or 2, further comprising one or more of:
   an accelerator;
   a first silane;
   a second silane that is different from the first silane; and
   a thinner.

4. The ink composition of claim 3, wherein:
   the accelerator is in an amount of about 0.01% to 0.2% by weight of the composition;
   the first silane is in an amount of about 3% to 6% by weight of the composition;
   the second silane is in an amount of about 0.5% to about 4% by weight of the composition; and/or
   the thinner is in an amount of about 25% to 40% by weight of the composition.

5. The ink composition of claim 3, comprising:
   the base epoxy ink;
   the pigment;
   the catalyst;
   the first wax treated silica powder;
   the second wax treated silica powder;
   the accelerator;
   the first silane;
   the second silane; and
   the thinner.

6. The ink composition of claim 5; wherein:
   the base epoxy ink is in an amount of about 6.8% to 78% by weight of the composition;
   the pigment is in an amount of about 1% to about 5% by weight of the composition;
   the catalyst is in an amount of about 15% to 25% by weight of the composition;
   the first wax treated silica powder is in an amount of about 3% to 8% by weight of the composition;
   the second wax treated silica powder is in an amount of about 1% to 5% by weight of the composition;
   the accelerator is in an amount of about 0.01% to 0.2% by weight of the composition;
   the first silane is in an amount of about 3% to 6% by weight of the composition;
   the second silane is in an amount of about 0.5% to about 4% by weight of the composition; and
   the thinner is in an amount of about 25% to 40% by weight of the composition.

7. The ink composition of claim 1, wherein the base epoxy ink is in an amount of not more than about 51.5% by weight of the composition.

8. The ink composition of claim 1, wherein the first wax treated silica powder has a porosity of about 1.4 ml/gm to 1.6 ml/gm.

9. The ink composition of claim 1, wherein the second wax treated silica powder has a porosity of about 1.15 ml/gm to 1.35 ml/gm.

10. The ink composition of claim 1, wherein the first wax treated silica powder has a porosity of about 1.4 ml/gm to 1.6 ml/gm and the second wax treated silica powder has a porosity of about 1.15 ml/gm to 1.35 ml/gm.

11. The ink composition of claim 1, wherein the pigment is a white pigment.

12. The ink composition of claim 3, wherein the first silane provides for the adherence of thermal ink onto a substrate.

13. The ink composition of claim 3, wherein the second silane provides for a matt finish of the cured ink on the substrate.

14. The ink composition of claim 12, wherein the adherence of the ink to a substrate is resistant to Xylene.

15. The ink composition of claim 12, wherein the substrate is glass.

16. The ink composition of claim 1, wherein when coated onto a substrate and cured, the ink composition is itself a substrate that can be printed on by either inkjet or thermal printing.

17. A method of making an ink composition, the method comprising combining:
   a base epoxy ink;
   a pigment;
   a catalyst;
   a first wax treated silica powder having an average particle size of about 4 to 6 microns, a melting point of the wax of about 65 to 85° C., and a pH of about 7; and
   a second wax treated silica powder that has a different porosity than the first wax treated silica powder and having an average particle size of about 4 to 6 microns, a melting point of the wax of about 65 to 85° C., and a pH of about 7.

18. The method of claim 17, wherein the method comprising the steps of:
   (a) mixing together the base epoxy ink, the pigment, and the catalyst to form an ink mixture;
   (b) separately mixing together the first wax treated silica powder and the second wax treated silica powder, to form a powder mixture; and
   (c) mixing the powder mixture of (b) into the ink mixture of (a).

19. The method of claim 17, wherein the method further comprises: combining with an accelerator.

20. The method of claim 18, further comprising combining a thinner, a first silane, and a second silane to form a silane mixture and mixing the silane mixture into the powder mixture of (b) before mixing the powder mixture into the ink mixture in step (c).

21. The method of claim 20, comprising the steps of:
   (i) mixing together the thinner and the first silane;
   (ii) mixing the second silane into the mixture of the thinner and the first silane to form a silane mixture; and then mixing the silane mixture of (ii) into the powder mixture of (b) before mixing the powder mixture into the ink mixture in step (c).

22. The method of claim 17, comprising mixing together:
   the base epoxy ink;
   the pigment;
   an accelerator;
   the catalyst;
   the first wax treated silica powder;
   the second wax treated silica powder;
   a thinner;
   a first silane; and
   a second silane.

23. The method of claim 22, comprising the steps of:
   (a) mixing together the base epoxy ink, the pigment, the accelerator, and the catalyst to form an ink mixture;
   (b) separately mixing together the first wax treated silica powder and the second wax treated silica powder, to form a powder mixture; and
   (c) mixing the powder mixture of (b) into the ink mixture of (a) to form an ink suitable for printing; and separately:
   (i) mixing together the thinner and the first silane;
   (ii) mixing the second silane into the mixture of the thinner and the first silane to form a silane mixture; and then
   mixing the silane mixture of (ii) into the powder mixture of (b) before mixing the powder mixture into the ink mixture in step (c).

24. A substrate coated with the ink composition of claim 1.

25. The coated substrate of claim 24, wherein the coated substrate is further printed on by inkjet or thermal printing.

26. A method of thermal printing and/or inkjet printing comprising using the ink composition of claim 1.

27. A method of coating a substrate, the method comprising applying to a portion of the surface of the substrate a layer of the ink composition of claim 1.

28. The method of claim 27, wherein when cured, the coating of the ink composition on the substrate can be used as a substrate to be printed on by inkjet or thermal printing.

29. A method of printing on a glass slide, the method comprising coating a portion of the surface of the glass slide with a layer of the ink composition of claim 1, curing the ink composition, and printing on the coated portion of the slide.

30. A glass slide, wherein a portion of the surface of the glass slide is coated with a layer of the ink composition of claim 1.

31. The glass slide of claim 30, wherein the coated portion of the slide contains inkjet or thermal printing over the ink composition.

* * * * *